United States Patent
Harbaugh et al.

(10) Patent No.: US 7,106,024 B2
(45) Date of Patent: Sep. 12, 2006

(54) FILTER WITH INCREASED FIRST HARMONIC RESPONSE AND REDUCED PHASE SHIFT IN A WIDE FREQUENCY BAND FOR ENCODERLESS DRIVE APPLICATIONS

(75) Inventors: Mark Melvin Harbaugh, Richfield, OH (US); Semyon Royak, Beachwood, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 256 days.

(21) Appl. No.: 10/661,132

(22) Filed: Sep. 12, 2003

(65) Prior Publication Data

US 2005/0057212 A1    Mar. 17, 2005

(51) Int. Cl.
  *H02P 23/00*     (2006.01)
  *H02P 25/00*     (2006.01)
  *H02P 27/00*     (2006.01)
  *H02P 27/04*     (2006.01)

(52) U.S. Cl. ............... 318/809; 318/727; 318/807; 318/503

(58) Field of Classification Search ............ None
  See application file for complete search history.

(56) References Cited

U.S. PATENT DOCUMENTS

| | | | | |
|---|---|---|---|---|
| 4,196,463 A * | 4/1980 | Dickerson | ............ | 361/113 |
| 4,775,924 A * | 10/1988 | Sweezy | ............ | 363/51 |
| 5,446,923 A * | 8/1995 | Martinson et al. | ............ | 455/330 |
| 5,502,360 A | 3/1996 | Kerkman et al. | | |
| 5,559,419 A | 9/1996 | Jansen et al. | | |
| 5,608,276 A * | 3/1997 | Suelzle | ............ | 307/152 |
| 5,614,770 A * | 3/1997 | Suelzle | ............ | 307/105 |
| 5,668,457 A * | 9/1997 | Motamed | ............ | 318/606 |
| 5,689,169 A | 11/1997 | Kerkman et al. | | |
| 5,731,698 A * | 3/1998 | Fujii et al. | ............ | 324/76.77 |
| 5,793,167 A * | 8/1998 | Liang et al. | ............ | 318/141 |
| 6,239,582 B1 * | 5/2001 | Buzan et al. | ............ | 322/20 |
| 6,281,659 B1 | 8/2001 | Giuseppe | | |
| 6,710,495 B1 * | 3/2004 | Lipo et al. | ............ | 310/184 |
| 2003/0085627 A1 * | 5/2003 | Lipo et al. | ............ | 310/12 |

OTHER PUBLICATIONS

A New Zero Frequency Flux Position Detection Approach for Direct Field Oriented Control Devices, 1999 IEEE, pp. 2290-2297, Consoli, et al.

Using Multiple Saliencies for the Estimation of Flux, Position, and Velocity in AC Machines, IEEE Trans. of Ind. Applns, vol. 34, No. 5, Sep./Oct. 1998, pp. 1097-1104, Denner et al.

(Continued)

*Primary Examiner*—Marlon Fletcher
*Assistant Examiner*—Renata McCloud
(74) *Attorney, Agent, or Firm*—Quarles & Brady LLP; William R. Walbrun

(57) ABSTRACT

A method and apparatus for use with a controller that supplies voltages to an induction machine via supply lines, the voltages including a fundamental voltage component and an injected voltage component, the line voltages also including harmonic voltage components where the harmonic voltage components include at least a high frequency first harmonic component having a frequency substantially equal to the sum of the fundamental component frequency and the injected component frequencies, the method for identifying the high frequency first harmonic component and comprising the steps of sensing the line voltages, identifying a zero sequence voltage component of the line voltages, rectifying the zero sequence voltage component to generate a rectified signal and using the rectified signal to identify the high frequency first harmonic component.

26 Claims, 9 Drawing Sheets

OTHER PUBLICATIONS

Sensorless Field Orientation Control of an Induction Machine by High Frequency Signal Injection, IEEE Ind. Applns. Soc., Annual Meeting, Oct. 1997, pp. 426-432, Ha et al.

Air-Gap Flux Position Estimation of Inaccessible Neutral Induction Machines by Zero Sequence Voltage, 6 pages, Jun. 6, 2000, Consoli et al.

Sensorless Field Oriented Control Using Common Mode Currents, 2000, 8 pages, Consoli et al.

U.S. Appl. No. 10/610,427 filed Jun. 30, 2003, Flux Position Identifier Using High Frequency Injection, 10 sheets of drawings, Royak, et al.

\* cited by examiner

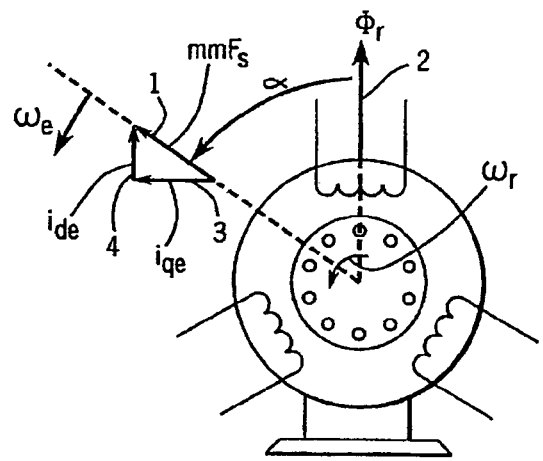
**Fig. 1
Prior Art**
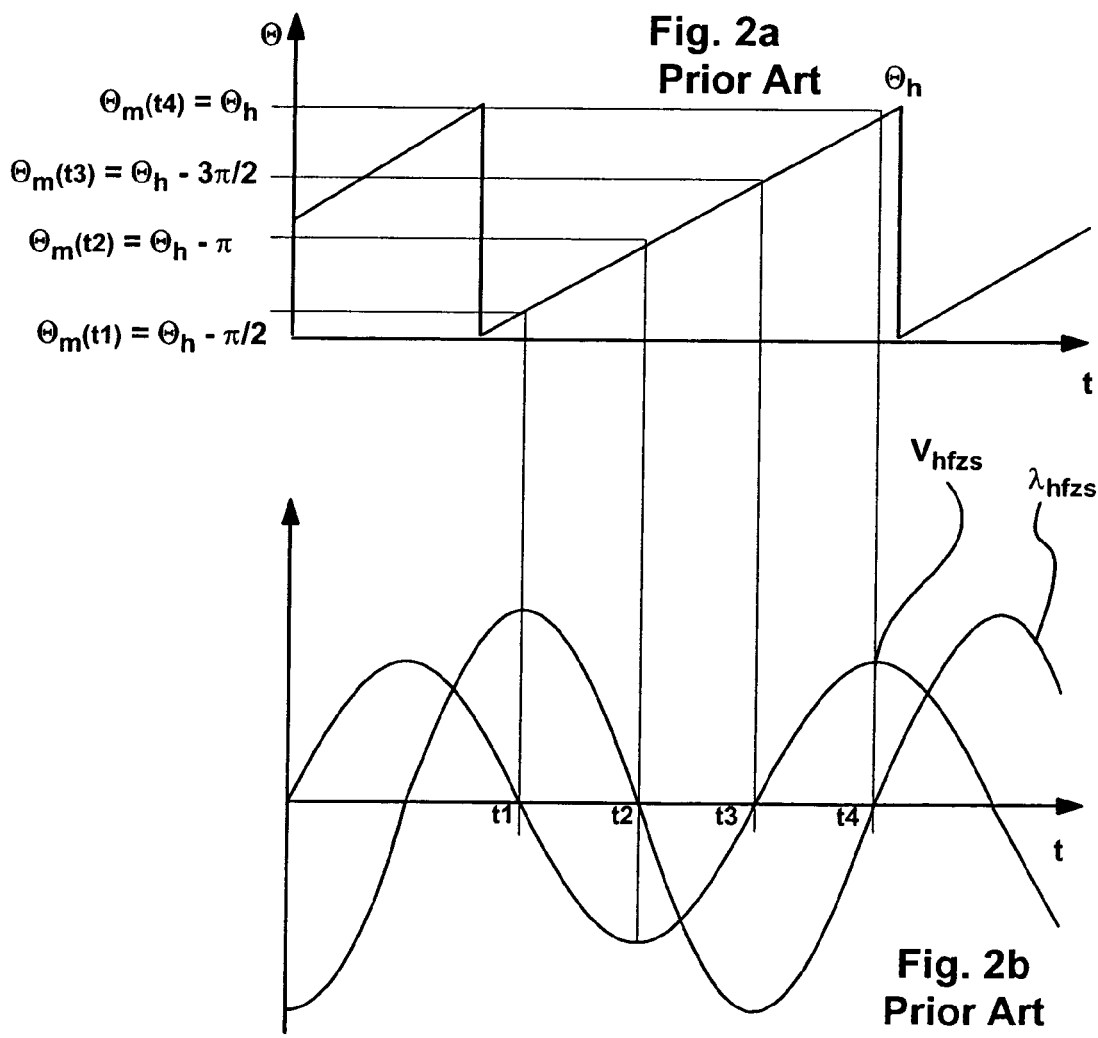
**Fig. 2a
Prior Art**
**Fig. 2b
Prior Art**

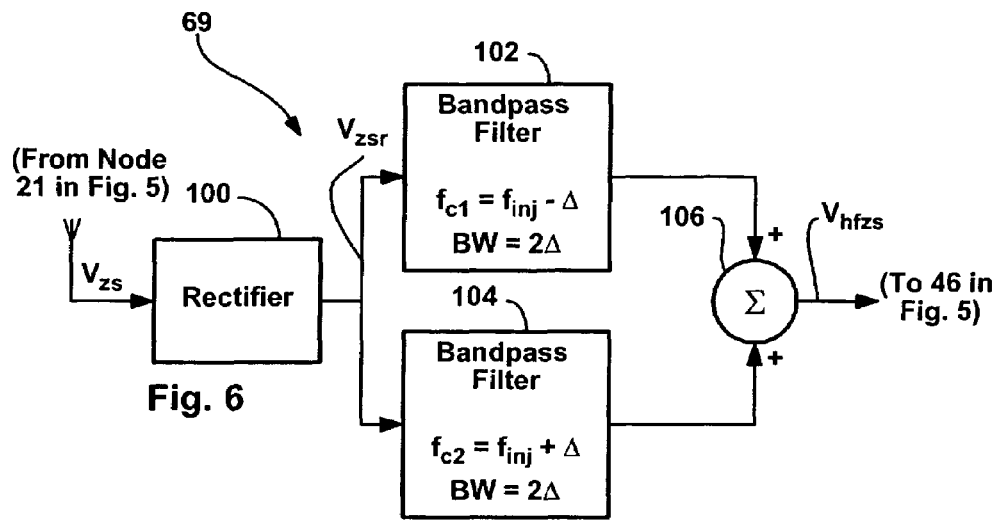
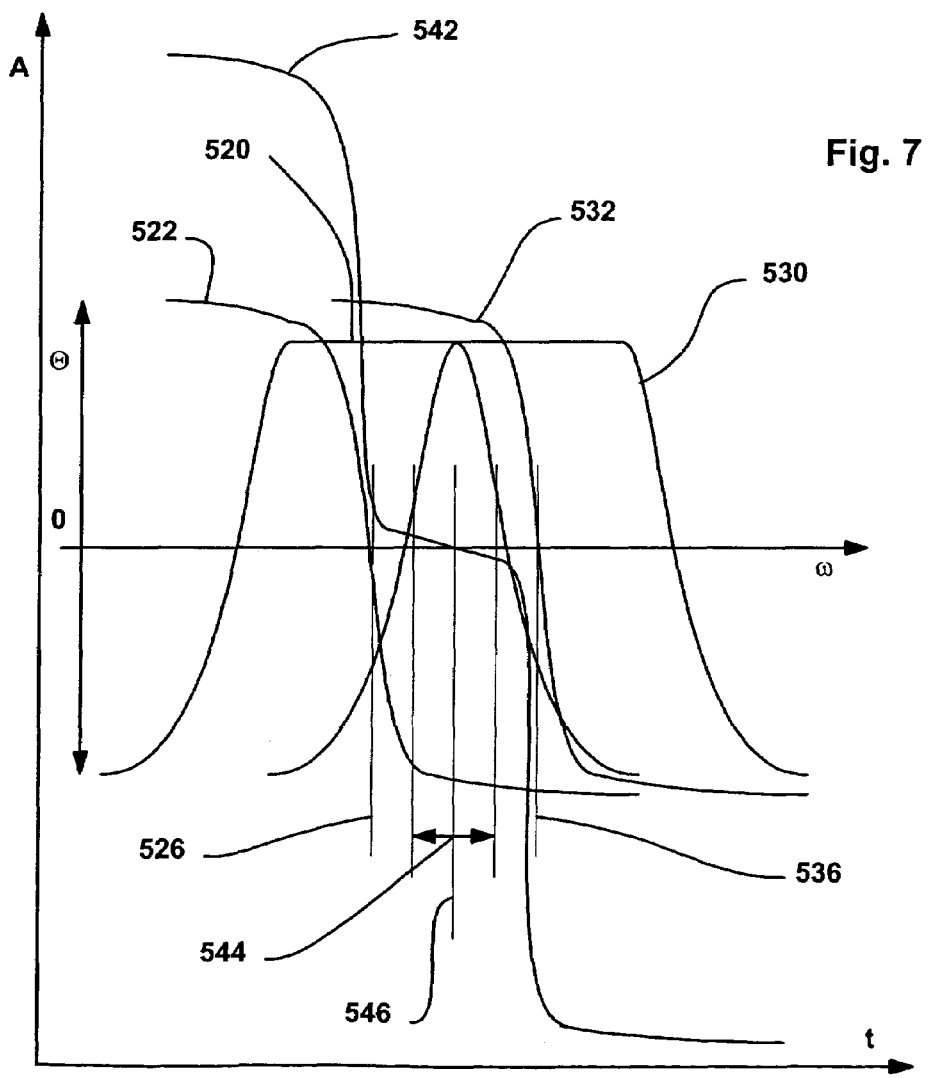

FILTER WITH INCREASED FIRST HARMONIC RESPONSE AND REDUCED PHASE SHIFT IN A WIDE FREQUENCY BAND FOR ENCODERLESS DRIVE APPLICATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is AC induction motor drives and more specifically the area of injecting high frequency voltage signals into an AC induction motor and using high frequency feedback signals to identify stator flux position.

Induction motors have broad application in industry, particularly when large horsepower is needed. In a three-phase induction motor, three phase alternating voltages are impressed across three separate motor stator windings and cause three phase currents therein. Because of inductances, the three currents typically lag the voltages by some phase angle. The three currents produce a rotating magnetic stator field. A rotor contained within the stator field experiences an induced current (hence the term "induction") which generates a rotor field. The rotor field typically lags the stator field by some phase angle. The rotor field is attracted to the rotating stator field and the interaction between the two fields causes the rotor to rotate.

A common rotor design includes a "squirrel cage winding" in which axial conductive bars are connected at either end by shorting rings to form a generally cylindrical structure. The flux of the stator field cutting across the conductive bars induces cyclic current flows through the bars and across the shorting rings. The cyclic current flows in turn produce the rotor field. The use of this induced current to generate the rotor field eliminates the need for slip rings or brushes to provide power to the rotor, making the design relatively maintenance free.

To a first approximation, the torque and speed of an induction motor may be controlled by changing the frequency of the driving voltage and thus the angular rate of the rotating stator field. Generally, for a given torque, increasing the stator field rate will increase the speed of the rotor (which follows the stator field). Alternatively, for a given rotor speed, increasing the frequency of the stator field will increase the torque by increasing the slip, that is the difference in speed between the rotor and the stator fields. An increase in slip increases the rate at which flux lines are cut by the rotor, increasing the rotor generated field and thus the force or torque between the rotor and stator fields.

Referring to FIG. 1, a rotating phasor 1 corresponding to a stator magneto motive force ("mmf") will generally have some angle a with respect to the phasor of rotor flux 2. The torque generated by the motor will be proportional to the magnitudes of these phasors 1 and 2 but also will be a function of their angle α. Maximum torque is produced when phasors 1 and 2 are at right angles to each other whereas zero torque is produced if the phasors are aligned. The stator mmf phasor 1 may therefore be usefully decomposed into a torque producing component 3 perpendicular to rotor flux phasor 2 and a flux component 4 parallel to rotor flux phasor 2.

These two components 3 and 4 of the stator mmf are proportional, respectively, to two stator current components: $i_q$, a torque producing current, and $i_d$, a flux producing current, which may be represented by quadrature or orthogonal vectors in a rotating or synchronous frame of reference (i.e., a reference frame that rotates along with the stator flux vector) and each vector $i_q$ and $i_d$ is characterized by slowly varying DC magnitude.

Accordingly, in controlling an induction motor, it is generally desired to control not only the frequency of the applied voltage (hence the speed of the rotation of the stator flux phasor 1), but also the phase of the applied voltage relative to the current flow and hence the division of the currents through the stator windings into the $i_q$ and $i_d$ components. Control strategies that attempt to independently control current components $i_q$ and $i_d$ are generally referred to as field oriented control strategies ("FOC").

Generally, it is desirable to design FOC strategies that are capable of driving motors of many different designs and varying sizes. Such versatility cuts down on research, development, and manufacturing costs and also results in easily serviceable controllers. Unfortunately, while versatile controllers are cost-effective, FOC controllers cannot control motor operation precisely unless they can adjust the division of d and q-axis currents through the stator windings to account for motor-specific operating parameters. For this reason, in order to increase motor operating precision, various feedback loops are typically employed to monitor stator winding currents and voltages and/or motor speed. A controller uses feedback information to determine how the inverter supplied voltage must be altered to compensate for system disturbances due to system specific and often dynamic operating parameters and then adjusts control signals to supply the desired inverter voltages.

To this end, in an exemplary FOC system, two phase d and q-axis command currents are provided that are calculated to control a motor in a desired fashion. The command currents are compared to d and q-axis motor feedback currents to generate error signals (i.e., the differences between the command and feedback currents). The error signals are then used to generate d and q-axis command voltage signals which are in turn transformed into three phase command voltage signals, one voltage signal for each of the three motor phases. The command voltage signals are used to drive a pulse width modulated (PWM) inverter that generates voltages on three motor supply lines. To provide the d and q-axis current feedback signals the system typically includes current sensors to sense the three phase line currents and a coordinate transformation block is used to transform the three phase currents to two phase synchronous dq frame of reference feedback currents.

In addition to requiring two phase signals and three phase signals to perform 2-to-3 and 3-to-2 phase transformations, respectively, a precise flux position angle estimate $\theta'_m$ is also required. One common way to generate a flux angle feedback estimate is to integrate a stator frequency. A stator frequency can be determined by adding a measured rotor frequency (rotor speed) and a calculated slip frequency. In the case of drives that do not include a rotor speed sensor, it is necessary to estimate both the rotor frequency and the slip frequency to determine the flux angle. Thus, these drives require precise knowledge of motor parameter values.

In an effort to reduce system costs and increase reliability, the controls industry has recently developed various types of sensorless or self-sensing induction machine systems that, as the labels imply, do not include dedicated speed sensing hardware and corresponding cabling but that, nevertheless, can generate accurate position, flux and velocity estimates. Techniques used for operating parameter estimation can be divided into two groups including techniques that track speed dependent phenomenon and techniques that track spatial saliencies in system signals. These techniques generally use disturbances in d and q-axis feedback currents to identify the operating parameters of interest and hence provide additional functionality which, in effect, "piggybacks" on feedback signals that are obtained for another purpose (i.e., dq current components are already required for FOC).

Because speed dependent techniques depend on speed in order to generate an identifiable feedback signal, these techniques ultimately fail at zero or low (e.g., below 5 Hz) excitation frequency due to lack of signal. In addition, because these methods estimate operating parameters from voltage and current, these techniques are sensitive to temperature varying system parameters such as stator resistance, etc.

One type of saliency tracking technique includes injecting or applying a known high frequency "injection" voltage signal in addition to each of the command voltage signals used to drive the PWM inverter and using feedback current (or voltage) signals to identify saliencies associated with the flux angle. To this end, an exemplary system converts a high frequency command signal into a high frequency phase angle and generates a first injection signal that is the product of a scalar and the sine of the high frequency phase angle. Second and third injection signals are also generated, each of the second and third signals phase shifted from the first signal by 120 degrees. A separate one of the first, second and third signals is then added to a separate one of the three voltage command signals that are used to drive the PWM inverter.

One injection type saliency tracking algorithm to generate a flux position angle estimate without a rotor speed sensor employs a negative sequence of the high frequency current component and is described in an article that issued in the IEEE Transactions on Industry Applications publication, vol. 34, No. 5, September/October 1998 by Robert Lorenz which is entitled "Using Multiple Saliencies For The Estimation Of Flux Position, And Velocity In AC Machines" (hereinafter "the Lorenz article"). The algorithm in the Lorenz article is based on the fact that when a high frequency voltage signal (referred to in the Lorenz article as a "carrier signal") is injected into a rotating system, a resulting high frequency field interacts with system saliency to produce a "carrier" signal current that contains information relating to the position of the saliency. The carrier current consists of both positive and negative-sequence components relative to the carrier signal voltage excitation. While the positive sequence component rotates in the same direction as the carrier signal voltage excitation and therefore contains no spatial information, the negative-sequence component contains spatial information in its phase. The Lorenz article teaches that the positive sequence component can be filtered off leaving only the negative-sequence component which can be fed to an observer used to extract flux angle position information.

Unfortunately, algorithms like the algorithm described in the Lorenz article only works well if an induction machine is characterized by a single sinusoidally distributed spatial saliency. As known in the art, in reality, motor currents exhibit more than a single spatial saliency in part due to the fact that PWM inverters produce a plethora of harmonics. As a result, the phase current negative sequence comprises a complicated spectrum that renders the method described in the Lorenz article relatively inaccurate.

Injection type saliency tracking algorithms employ a zero sequence high frequency current or voltage component instead of the negative sequence current component. One such technique is described in an article that issued in the IEEE IAS publication, pp. 2290–2297, Oct. 3–7, 1999, Phoenix Ariz., which is entitled "A New Zero Frequency Flux Position Detection Approach For Direct Field Orientation Control Drives" (hereinafter "the Consoli article"). The Consoli article teaches that the main field of an induction machine saturates during system operation which causes the spatial distribution of the air gap flux to assume a flattened sinusoidal waveform including all odd harmonics and dominated by the third harmonic of the fundamental. The third harmonic flux component linking the stator windings induces a third harmonic voltage component (i.e., a voltage zero sequence) that is always orthogonal to the flux component and that can therefore be used to determine the flux position. Unfortunately, the third harmonic frequency is low band width and therefore not particularly suitable for instantaneous position determination needed for low speed control.

The Consoli article further teaches that where high frequency signals are injected into a rotating system, the injected signals produce a variation in the saturation level that depends on the relative positions of the main rotating field Fm and high frequency rotating field $F_h$. Due to the fundamental component of the main field $F_m$, the impedance presented to the high frequency injected signal varies in space and an unbalanced impedance system results. The Consoli article teaches that the unbalanced system produces a zero sequence voltage component that, in addition to including an injected frequency component and a fundamental zero sequence component, includes an additional component (hereinafter "the high frequency first harmonic component") having an angular frequency represented by the following equation:

$$\omega_{h1zs} = \omega_h \pm \omega_1 \qquad \text{Eq. 1}$$

where:

$\omega_{h1zs}$ = high frequency first harmonic component frequency;

$\omega_h$ = high frequency injected signal frequency;

$\omega_1$ = fundamental (i.e., first harmonic) stator frequency; and where the sign "±" is negative if the high frequency "injected" signal has a direction that is the same as the fundamental field direction and is positive if the injected signal has a direction opposite the fundamental field direction.

In this case, referring to FIGS. 2a and 2b, an air gap flux component $\lambda_{hfzs}$ associated with the high frequency first harmonic component and that results from complex interaction of the fundamental stator frequency component and the injected high frequency signal induces a high frequency first harmonic voltage component $V_{hfzs}$ on the stator windings that always leads flux component $\lambda_{hfzs}$ by 90°. Hereinafter additional voltage component $V_{hfzs}$ will be referred to as the high frequency first harmonic voltage component and the additional flux component $\lambda_{hfzs}$ will be referred to as the high frequency first harmonic flux component unless indicated otherwise. The maximum high frequency first harmonic flux component $\lambda_{hfzs}$ always occurs when the main field $F_m$ and high frequency rotating field $F_h$ are aligned and in phase and the minimum high frequency first harmonic flux component $\lambda_{hfzs}$ always occurs when the main field $F_m$ and high frequency rotating field $F_h$ are aligned but in opposite phase. Thus, in theory, by tracking the zero crossing points of the high frequency first harmonic voltage component $V_{hfzs}$ and the instances when minimum and maximum values of the high frequency first harmonic voltage component $V_{hfzs}$ occur, the angular position $\theta_h$ of the high frequency rotating field $F_h$ can be used to determine the position $\theta_m$ of the main air gap flux.

For instance, referring to FIGS. 2a and 2b, and also to FIGS. 14 and 15, at time t1 (see FIG. 14) when voltage component $V_{hfzs}$ is transitioning from positive to negative and crosses zero, main field $F_m$ is in phase and aligned with the high frequency flux $\lambda_{hfzs}$ (i.e., field $F_h$) which lags voltage $V_{hfzs}$ by 90° and therefore main field angle $\theta_m$ can be determined by solving the equation $\theta_h - \pi/2$ (where $\theta_h$ is the high frequency injected signal angle). As indicated in FIG. 2b, at time t1 high frequency first harmonic voltage component $V_{hfzs}$ has a zero value. Nevertheless, in FIG. 14 voltage $V_{hfzs}$ is illustrated as having a magnitude so that angle $\theta_h$ is illustrated as having a magnitude and angle $\theta_h$ can be illustrated. Similar comments are applicable to FIG. 15 and time t3.

At time t2 where voltage $V_{hfzs}$ reaches a minimum value, main field $F_m$ and flux $\lambda_{hfzs}$ are in quadrature and therefore main field angle $\theta_m$ can be expressed as $\theta_h - \pi$ (i.e., 90° between signal $V_{hfzs}$ and flux $\lambda_{hfzs}$ and another 90° between flux $\lambda_{hfzs}$ and main field $F_m$ for a total of $\pi$). At time t3 (see FIG. 15) where voltage $V_{hfzs}$ is transitioning from negative to positive through zero, the main field is out of phase with flux component $\lambda_{hfzs}$ and therefore main field angle $\theta_m$ can be expressed as $\theta_h - 3\pi/2$. Similarly, at time t4 voltage $V_{hfzs}$ reaches a maximum value with the main field $F_m$ and flux component $\lambda_{hfzs}$ (i.e., field $F_h$) again in quadrature and main field $F_m$ leading flux component $\lambda_{hfzs}$ and therefore main field angle $\theta_m$ is equal to high frequency angel $\theta_h$. Thus, where the high frequency first harmonic voltage component (i.e., the component having a frequency equal to the sum of the injected signal frequency and the fundamental stator frequency) can be extracted, Consoli teaches that the main field angle $\theta_m$ is determinable.

To extract the high frequency first harmonic voltage component Consoli teaches that a band pass filter may be employed. Here, the filter would be tuned to have a bandwidth substantially centered on the injected signal frequency so that high frequency signals within a few Hz (e.g., within 10 Hz) of the injected signal frequency could be identified. Thus, for instance, where the injected signal frequency is 200 Hz, the band pass filter may have cutoff frequencies of 190 Hz and 210 Hz.

While the Consoli type system operates well in theory, in reality, the high frequency first harmonic signal required by Consoli is difficult to extract in a practical manner. Extraction of the high frequency first harmonic is complicated by a number of factors. First, the amplitude of any particular signal within the frequency pass band of interest (e.g., a frequency range centered on the injected signal frequency) is typically 10 to 100 times smaller than the carrier frequency in the zero sequence voltage feedback signal. A relatively high order (e.g., $4^{th}$, $8^{th}$, etc.) band pass filter has typically been required to sufficiently attenuate the carrier frequency, the fundamental frequency and its harmonics, line harmonics, and other spurious noise within the zero sequence feedback signal.

As the order of the bandpass filter is increased, the phase shift associated with the filter bandwidth frequencies increases appreciably and may de-stabilize a control system. To this end, FIG. 3 illustrates amplitude and phase waveforms 510 and 512 of a typical high order (e.g., $4^{th}$ order or greater) IIR bandpass filter. As illustrated, approximately 30% of the filter bandwidth centered on the injected signal frequency is utilized by an encoderless AC drive system. Hereinafter, the utilized 30% of the pass band or the pass band of interest (PBI) will be referenced by numeral 514. Referring specifically to the section of phase waveform 512 within PBI 514, there is significant phase variation 518 at different PBI frequencies. Thus, for instance, where the injected signal frequency is 200 Hz and the high frequency first harmonic component is at 201 Hz, the phase shift may be 20 degrees. Here, if the high frequency first harmonic is used to identify the main field flux position, the estimated main field flux position may be off by 20 degrees. Complicating matters further, as the fundamental stator frequency is altered (e.g., form 1 Hz to 2 Hz), the altered fundamental will cause a different phase shift. For instance, where the injected signal frequency is 200 Hz and the high frequency first harmonic component is at 202 Hz (i.e., the fundamental stator frequency is changed form 1 Hz to 2 Hz), the phase shift may be 50 degrees instead of 20 degrees.

Second, even if a filter were designed that had acceptable phase shift within the PBI, as in the case of the negative current component employed by Lorenz, high frequency zero sequence feedback signals within the PBI are typically characterized by a complicated harmonic spectrum. In this regard, see FIG. 9 which illustrates an exemplary zero sequence voltage feedback signal $V_{zs}$. In FIG. 9 the ratio of carrier frequency to high injected signal frequency is approximately 14 to 1. Thus, if the carrier frequency was 2800 Hz, the injected frequency would be approximately 200 Hz. Hereinafter an injected frequency of 200 Hz will be assumed unless indicated otherwise.

FIG. 4 includes a graph illustrating an exemplary frequency spectrum that was generated for a zero sequence voltage feedback signal like signal $V_{zs}$ illustrated in FIG. 9. The portion of the frequency spectrum illustrated only includes the frequencies within a PBI centered on a 200 Hz injected frequency (e.g., from approximately 196 to 204 Hz) where the fundamental stator frequency was 0.5781 Hz. In FIG. 4, spike 500 corresponds to the injected frequency component (e.g., 200 Hz), spike 502 corresponds to the high frequency first harmonic component (e.g., 199.4219 Hz), spike 504 corresponds to the high frequency second harmonic component and spike 506 corresponds to the high frequency fourth harmonic. Clearly, within PBI 514, high frequency first harmonic component 502 is dominated by the injected frequency component 500, the high frequency second harmonic component 504 and the high frequency fourth harmonic component 506. In fact, the dominant second harmonic component 504 has an amplitude that is more than 20 times the amplitude of the high frequency first harmonic component 502.

Referring again to FIG. 4, relative amplitudes of the high frequency harmonic components within the PBI complicate the task of extracting the high frequency first harmonic. In addition, the close spatial proximities of the high frequency components, particularly at low frequencies, render it impractical to isolate the high frequency first harmonic component using a single high order band pass filter.

BRIEF SUMMARY OF THE INVENTION

It has been recognized that a simple manipulation of the zero sequence voltage feedback signal can generate an altered signal where the high frequency first harmonic component is dominant within the PBI (i.e., the pass band of interest). Thereafter, the altered signal can be used to identify high frequency first harmonic voltage signal zero crossings which can then be used to facilitate a Consoli type or similar method. More specifically, it has been recognized that the zero sequence voltage feedback signal can be rectified to render an altered or rectified signal wherein the high frequency first harmonic component is dominant within the PBI.

It has also been recognized that two bandpass filters can be cobbled together to provide an output frequency spectrum with minimal phase shift within the PBI. More specifically, first and second bandpass filters can be provided where the filters have different pass bands and center frequencies that are equi-spaced from the injected signal frequency. The zero sequence voltage feedback signal (or the rectified signal) can be provided to each of the first and second filters and the filter output signals can then be added to produce a combined signal including frequencies within the PBI where the phase shift within the PBI is reduced appreciably.

In at least some embodiments the zero sequence voltage feedback signal is first rectified and then filtered via first and second separate bandpass filters and the resulting first and second filtered signals are then added. Here, the rectification yields a signal where the high frequency first harmonic is dominant within the PBI and the filter arrangement renders a signal wherein the phase shift associated with the high frequency first harmonic is minimal such that the resulting signal is ideal for use in a Consoli type method.

Consistent with the above, the invention includes a method for use with a controller that supplies voltages to an induction machine via supply lines, the voltages including a fundamental voltage component and an injected voltage component, the line voltages also including harmonic voltage components where the harmonic voltage components include at least a high frequency first harmonic component having a frequency substantially equal to the sum of the fundamental component frequency and the injected component frequencies, the method for identifying the high frequency first harmonic component and comprising the steps of sensing the line voltages, identifying a zero sequence voltage component of the line voltages, rectifying the zero sequence voltage component to generate a rectified signal and using the rectified signal to identify the high frequency first harmonic component.

The invention also includes a method for use with a controller that supplies voltages to an induction machine via supply lines, the voltages including a fundamental voltage component and an injected voltage component, the line voltages also including harmonic voltage components where the harmonic voltage components include at least a high frequency first harmonic component having a frequency substantially equal to the sum of the fundamental component frequency and the injected component frequencies, the method for identifying the high frequency first harmonic component and comprising the steps of identifying a derivative of the supply line voltages, filtering the derivative using a first band pass filter having a center frequency that is less than the injected voltage frequency and a bandwidth that includes the injected voltage frequency thereby generating a first filtered signal, filtering the derivative using a second band pass filter having a center frequency that is greater than the injected voltage frequency and a bandwidth that includes the injected voltage frequency thereby generating a second filtered signal, mathematically combining the first and second filtered signals to generate a combined signal and using the combined signal to identify the first harmonic component.

The invention also includes a method for use with a controller that supplies voltages to an induction machine via supply lines, the voltages including a fundamental voltage component and an injected voltage component, the line voltages also including harmonic voltage components where the harmonic voltage components include at least a high frequency first harmonic component having a frequency substantially equal to the sum of the fundamental component frequency and the injected component frequencies, the method for identifying the high frequency first harmonic component and comprising the steps of identifying a zero sequence voltage component from the supply lines, rectifying the zero sequence voltage component to generate a rectified signal, filtering the rectified signal using a first band pass filter having a center frequency that is less than the injected voltage frequency and a bandwidth that includes the injected voltage frequency thereby generating a first filtered signal, filtering the rectified signal using a second band pass filter having a center frequency that is greater than the injected voltage frequency and a bandwidth that includes the injected voltage frequency thereby generating a second filtered signal and adding the first and second filtered signals to generate the first harmonic component.

Moreover, at least some embodiments of the invention include an apparatus for use with a controller that supplies voltages to an induction machine via supply lines, the voltages including a fundamental voltage component and an injected voltage component, the line voltages also including harmonic voltage components where the harmonic voltage components include at least a high frequency first harmonic component having a frequency substantially equal to the sum of the fundamental component frequency and the injected component frequencies, the apparatus for identifying the high frequency first harmonic component and comprising a determiner for identifying a zero sequence voltage component of the supply line voltages, a rectifier for rectifying the zero sequence voltage component to generate a rectified signal and a filter using the rectified signal to identify the high frequency first harmonic component.

Furthermore, the invention includes an apparatus for use with a controller that supplies voltages to an induction machine via supply lines, the voltages including a fundamental voltage component and an injected voltage component, the line voltages also including harmonic voltage components where the harmonic voltage components include at least a high frequency first harmonic component having a frequency substantially equal to the sum of the fundamental component frequency and the injected component frequencies, the apparatus for identifying the high frequency first harmonic component and comprising a component for identifying a derivative of the supply line voltages, a first filter for filtering the derivative using a first band pass filter having a center frequency that is less than the injected voltage frequency and a bandwidth that includes the injected voltage frequency thereby generating a first filtered signal, a second filter for filtering the derivative using a second band pass filter having a center frequency that is greater than the injected voltage frequency and a bandwidth that includes the injected voltage frequency thereby generating a second filtered signal and a combiner for combining the first and second filtered signals to generate an output signal indicative of the first harmonic component combined signal.

These and other objects and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 1 is a schematic view in cross section of an induction motor showing instantaneous locations of a rotor flux, a stator mmf and the torque and flux components of the stator mmf;

FIGS. 2a and 2b are related graphs where FIG. 2a illustrates an exemplary high frequency angle and FIG. 2b illustrates corresponding high frequency zero sequence voltage and flux signals;

FIG. 6 is a schematic diagram illustrating one embodiment of the rectifier/filter of FIG. 5;

FIG. 7 is a graph similar to FIG. 3, albeit illustrating amplitude and phase characteristic waveforms of the first and second filters of FIG. 6 along with a combined phase characteristic waveform corresponding to the output of the summer of FIG. 6;

DETAILED DESCRIPTION OF THE INVENTION

Figure 3:
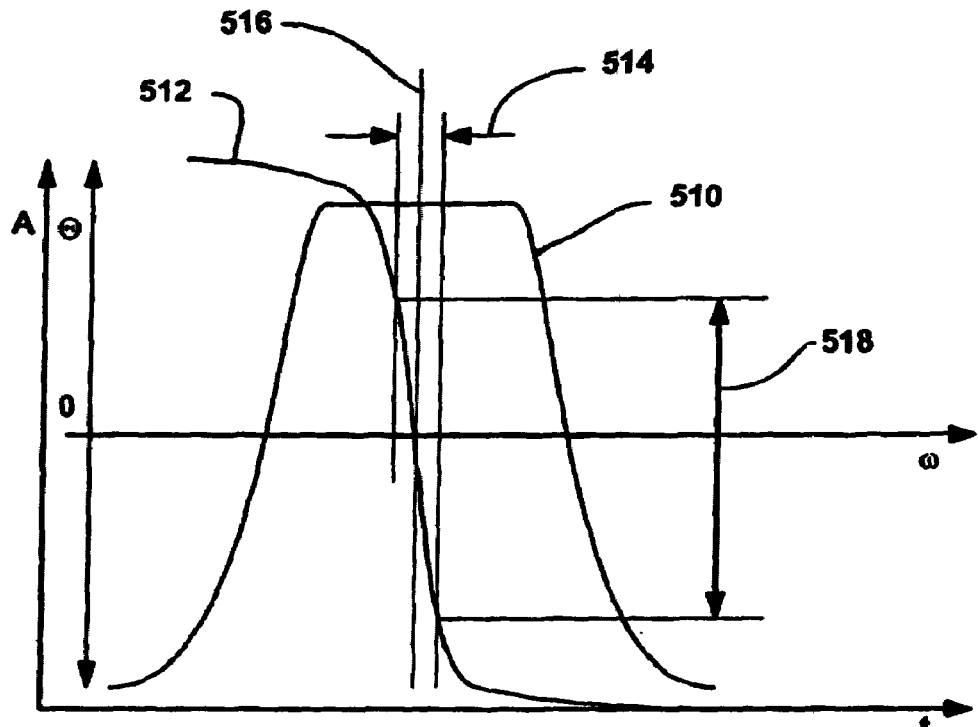
FIG. 3 is a graph illustrating exemplary amplitude and phase characteristic waveforms of a high order IIR bandpass filter.

In the description that follows, an "*" superscript denotes a command signal, an "f" subscript denotes a feedback signal, an "h" subscript denotes a high frequency signal, an "i" denotes that a corresponding signal relates to a current signal, a "V" denotes that a signal relates to a voltage signal, a "d" subscript denotes that a signal corresponds to a synchronous d-axis, a "q" subscript denotes that a signal corresponds to a synchronous q-axis, "u", "v" and "w" subscripts denote that corresponding signals relate to each of first, second and third system phases, a "zs" subscript also denotes a zero sequence signal, a "sw" subscript denotes a square wave, an "α" subscript denotes a stationary α-axis signal and a "β" subscript denotes a stationary β-axis signal. Also, it should be noted that the term "derivative" is used herein to refer generally to any value that is derived from another value. For example, a signal that is rectified from another signal is considered a derived signal. As another example, a sampled voltage is considered a derived signal because it is derived from an operating characteristic that exists on a line or cable.

While the following description details various blocks, steps, and functions, it should be remembered that all of these elements are meant to be implemented in software as computer programs and represent algorithms for execution by a conventional-type digital processor adapted for industrial applications. Hereinafter a general inventive method will first be described and thereafter a more detailed exemplary method will be described in the context of a control system.

Referring now to the drawings wherein like reference characters represent similar elements and signals throughout the several views and, more specifically, a referring to FIG. 5, the present invention will be described in the context of an exemplary motor control system 10 including a plurality of summers 12, 14, 20, 22 and 24, a plurality of multipliers 34, 36 and 38, a current regulator 16, a 2-3 phase and synchronous to stationary frame transformer 18, a PWM inverter 26, a three phase motor 28, an integrator 30, a sine table 32, an A-D converter 40, a 3-2 phase and stationary to synchronous frame transformer 42, a flux angle determiner 46, a scalar 41, a notch filter 52, a rectifier and filter 69 and a resistive network including three resistors 15, 17, 19.

Generally, system 10 receives two phase current command signals $i_q^*$ and $i_d^*$ and, based thereon, generates three phase voltages on motor supply lines linked to motor 28 to drive motor 28 in a desired fashion. The three phase voltages $V^*_u$, $V^*_v$ and $V^*_w$ together generate currents within each of the three motor phases. At least two of the three phase currents are sensed using hall effect sensors or some other suitable sensors (not numbered) and are provided as feedback currents to a feedback loop that is provided to eliminate the difference between the command currents $i_q^*$ and $i_d^*$ and the resulting currents delivered to motor 28.

Command currents $i_q^*$ and $i_d^*$ are provided to summers 14 and 12, respectively. The three phase motor currents are converted in a manner which will be described in more detail below to two phase d and q access feedback currents $i_{df}$ and $i_{qf}$, respectively, the two phase feedback currents $i_{df}$ and $i_{qf}$ being provided to summers 12 and 14, respectively. Summer 12 subtracts the d-axis feedback current $i_{df}$ from the d-axis command current $i_d^*$ to generate a d-axis error signal, which is provided to regulator 16. Similarly, summer 14 subtracts the q-axis feedback current $i_{qf}$ from the q-axis command current $i_q^*$ to generate an error signal, which is provided to regulator 16. Regulator 16 converts the current error signals to command voltage signals $V_q^*$ and $V_d^*$, which are provided to 2–3 phase and synchronous to stationary frame transformer 18.

Transformer 18 receives phase angle $\theta_m$ from determiner 46 and, using the received angle, coverts the command voltages $V_q^*$ and $V_d^*$ to three phase command voltages $V^*_u$, $V*_v$ and $V*_w$. The three phase command voltages are provided to summers 20, 22 and 24, respectively. Each of summers 20, 22 and 24 also receives a high frequency injection voltage signal. Generation of the high frequency injection voltage signals is described in more detail below. Summer 20 adds the received signals (i.e., command signal $V*_u$ and the high frequency injection voltage signal) and generates a modified single-phase voltage signal $V_{um}$, which is provided to inverter 26. Similarly, each of summers 22 and 24 adds their respective received signals and provides an output modified voltage signal $V_{vm}$ and $V_{wm}$, respectively, to inverter 26. Inverter 26 uses the modified voltage signals $V_{um}$, $V_{vm}$ and $V_{wm}$ to generate the three phase voltages $V_v$, $V_u$ and $V_w$ on the motor supply lines.

Figure 5:
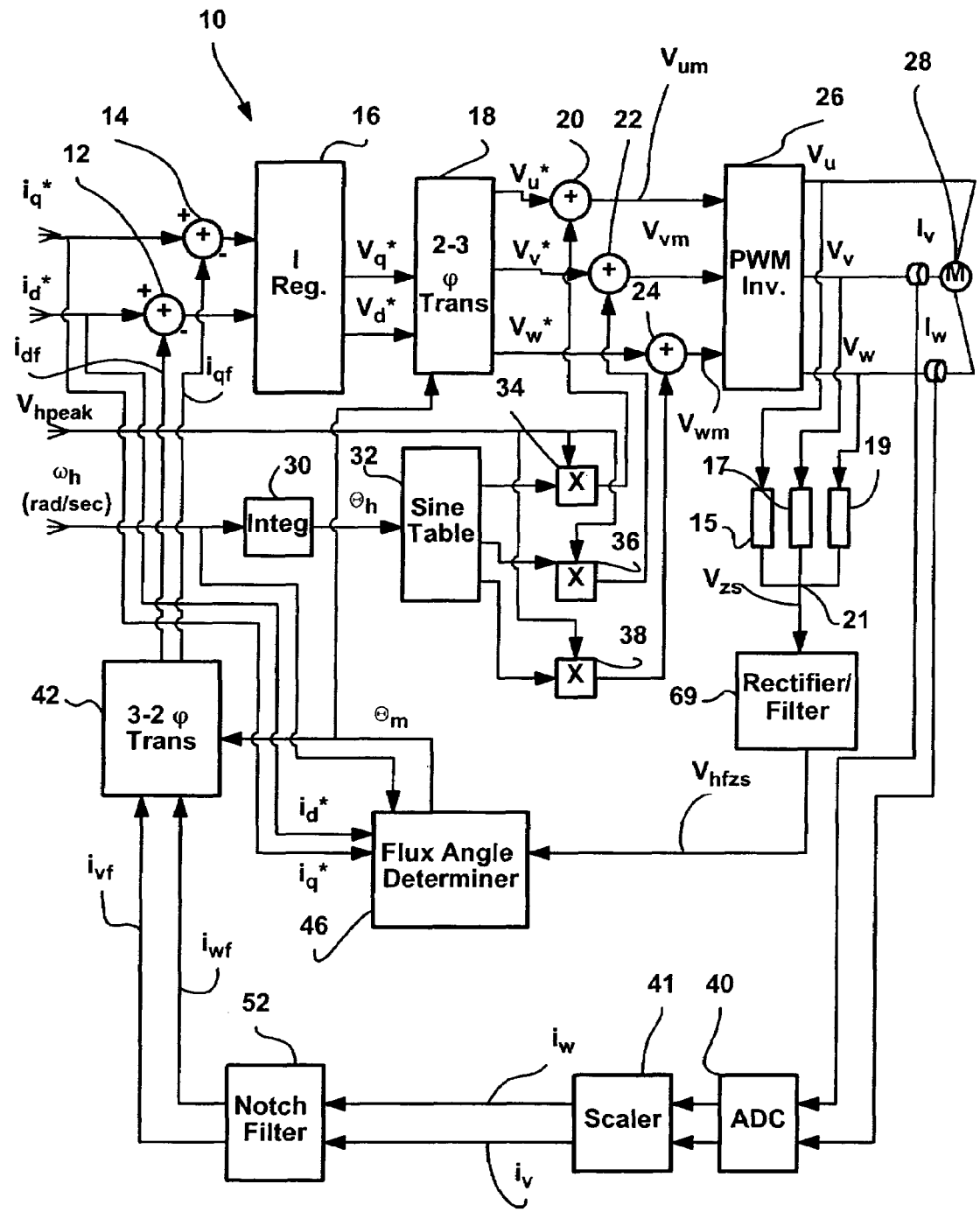
FIG. 5 is a schematic diagram of a motor control system according to the present invention.

Referring still to FIG. 5, in addition to command currents $i*_q$ and $i_d*$, two other values are provided as inputs to system 10 and are specifically used to generate the high frequency injection voltage signals that are added to the three phase command voltages $V*_u$, $V*_v$ and $V*_w$ via summers, 20, 22 and 24. Specifically, a peak high frequency magnitude signal $V_{hpeak}$ and a high frequency signal $\omega_h$ (i.e., indicating the frequency of the injected signal) are provided. High frequency signal $\omega_h$ is provided to determiner 46 and to integrator 30, which integrates the received signal and provides a high frequency angle $\theta_h$ to sine table 32.

Sine table 32 has first, second and third outputs which are linked to multipliers 34, 36 and 38, respectively. On the first output (i.e., the output linked to multiplier 34), sine table 32 provides the sine of high frequency angle $\Theta_h$. On the second output (i.e., the output linked to multiplier 36), sine table 32 provides the sine Of $(\theta_h+2\pi/3)$. On the third output (i.e., the output linked to multiplier 38), sine table 32 provides the sine of $(\theta_h+4\pi/3)$. Thus, sine table 32 generates three outputs where the outputs are the sines of angles that are separated by 120°.

The peak high frequency amplitude signal $V_{hpeak}$ is also provided to each of multipliers 34, 36 and 38. Multiplier 34 multiplies its received signals to generate the high frequency injection voltage signal provided to summer 20. Similarly, each of multipliers 36 and 38 multiplies their respective received signals together to generate high frequency injection signals that are provided to summers 22 and 24, respectively. As indicated above, summers 20, 22 and 24 add the high frequency signals to the three phase command signals $V*_u$, $V*_v$ and $V*_w$ to generate the modified voltages $V_{um}$, $V_{vm}$ and $V_{wm}$ to drive inverter 26.

Referring still to FIG. 5, the feedback currents from the two of the three motor phases are provided to the analog to digital converter 40 and scalar 41 which convert the received signals to digital signals and step up the signals where appropriate by a scalar number. Scalar 41 provides current feedback signals $i_v$ and $i_w$ to notch filter 52.

Notch filter 52 provides three-phase feedback currents $i_{vf}$ and $i_{wf}$ including components only within a specific notch range. More specifically, the notch range will typically exclude the high frequency $\omega_h$ provided to integrator 30. In this manner, the injected high frequency currents should be filtered out and should not directly effect the comparison of command and feedback currents by summers 12 and 14.

The three phase currents output by notch filter 52 are provided to the three to two phase and stationary to synchronous frame transformer 42. As well known in the controls art, any two phases of the three are enough for the three to two phase conversion and therefore, transformer 42 uses any two of the three phase feedback currents (e.g., $i_{uf}$ and $i_{wf}$) and electrical angle $\theta'_e$ provided by position-speed determiner 46 to generate the d and q-axis feedback currents $i_{df}$ and $i_{qf}$ respectively. As described above, the d and q-axis feed back currents $i_{df}$ and $i_{qf}$, respectively, are provided to summers 12 and 14 and are subtracted from corresponding command current signals $i_q*$ and $i_d*$.

Referring still to FIG. 5, the resistive network including resistors 15, 17 and 19 includes a separate resistor linked to each of the three output lines of inverter 26. The other ends of the resistors are tied to a common feedback node 21. The values of resistors 15, 17 and 19 are identical so that the resulting signal at node 21 is a zero sequence feedback signal $V_{zs}$. Here, prior to filtering, zero sequence signal $V_{zs}$ is complex and relatively noisy. More specifically, prior to filtering, signal $V_{zs}$ is particularly noisy within the PBI that is centered on the injected frequency $f_{inj}$ (e.g., 200 Hz in the present example) (see again FIG. 4).

The zero sequence signal $V_{zs}$ is fed to rectifier/filter 69 which generates a high frequency zero sequence feedback signal $V_{hfzs}$ that is dominated by the high frequency first harmonic component. Feedback signal $V_{hfsz}$ is provided to angle determiner 46 which uses signal $V_{hfzs}$ to perform a Consoli type determination of angle $\theta_m$. Here it should be noted that, while Consoli type methods are useful, other similar methods are contemplated and that the present invention should not be limited to a Consoli type method of using signal $V_{hfzs}$.

Referring now to FIG. 6, in at least some embodiments, rectifier/filter 69 includes a rectifier 100, first and second filters 102 and 104 and a summer 106. As its label implies, rectifier 100 rectifies zero sequence feedback signal $V_{zs}$.

Figure 9:
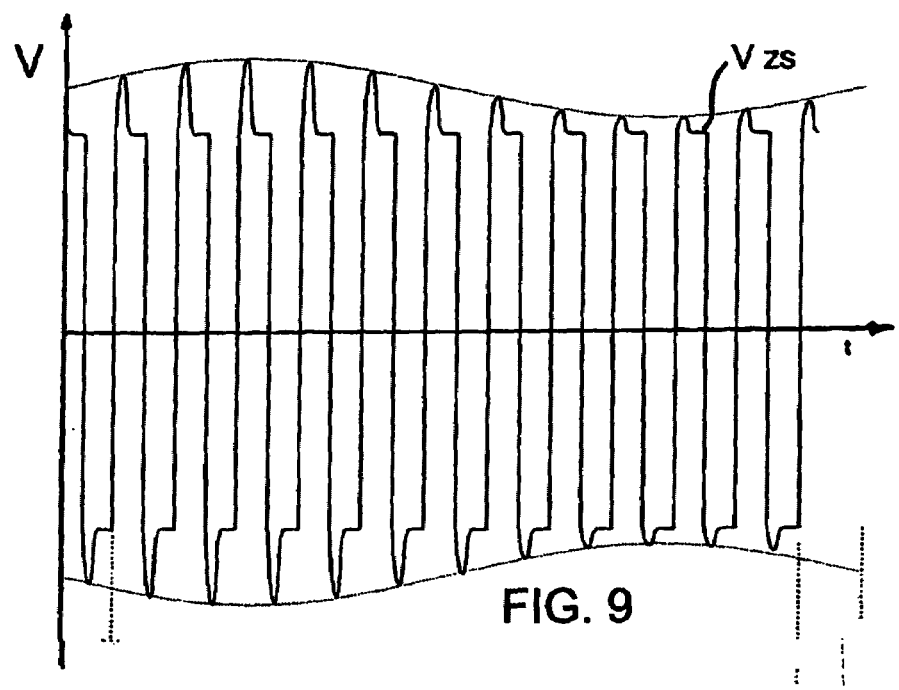
FIG. 9 is a graph illustrating a zero sequence voltage feedback signal.
Figure 10:
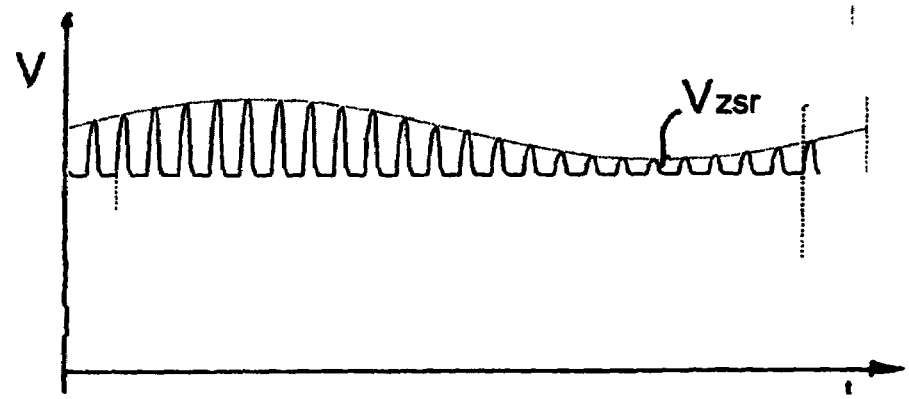
FIG. 10 is a waveform illustrating a signal that results from rectification of the zero sequence voltage feedback signal in FIG. 9.

Referring again to FIG. 9 and also to FIG. 10, after zero sequence signal $V_{zs}$ is rectified, the resulting rectified signal $V_{zsr}$ which is a derivative of the zero sequence voltage feedback signal has the illustrated shape and, importantly, it has been found, is dominated by the high frequency first harmonic component required by Consoli and other similar methods. In the illustrated embodiment, each of filters 102 and 104 is a bandpass filter and each has a similar bandwidth BW and characteristic phase shift waveform. In this regard see FIG. 7 where exemplary amplitude and phase characteristic waveforms are illustrated for each of filters 102 and 104. Amplitude waveform 520 and phase waveform 522 correspond to filter 102 while amplitude and phase waveforms 530 and 523, respectively, correspond to filter 104. The primary difference between filters 102 and 104 is that the center frequencies $f_{c1}$ and $f_{c2}$ are different. More specifically, in at lease some embodiments, where the filters 102 and 104 each have a bandwidth $2\Delta$, the center frequency $f_{c1}$ of first filter 102 is tuned to frequency $(f_{inj}-\Delta)$ while center frequency $f_{c2}$ of second filter 104 is tuned to frequency $(f_{inj}+\Delta)$.

Referring still to FIG. 7, with filters 102 and 104 tuned as described above, amplitude waveforms 520 and 530 are juxtaposed such that the corresponding bandwidths are contiguous and the combined bandwidth is centered 546 on the injection frequency $f_{inj}$. In addition, as illustrated in FIG. 7, minimal phase shift occurs for each of the filters within a PBI 544 about center frequency 546 (i.e., about the injected frequency $f_{inj}$).

Referring again to FIG. 6, the first and second filtered signals from filters 102 and 104 are provided to summer 106 which adds the received signals and generates a high frequency zero sequence signal $V_{hfzs}$. Referring again to FIG. 7, characteristic phase waveform 542 corresponds to high frequency zero sequence signal $V_{hfzs}$. As illustrated, within the PBI 544, the phase shift is minimized and hence more accurate results are achieved.

Figure 8:
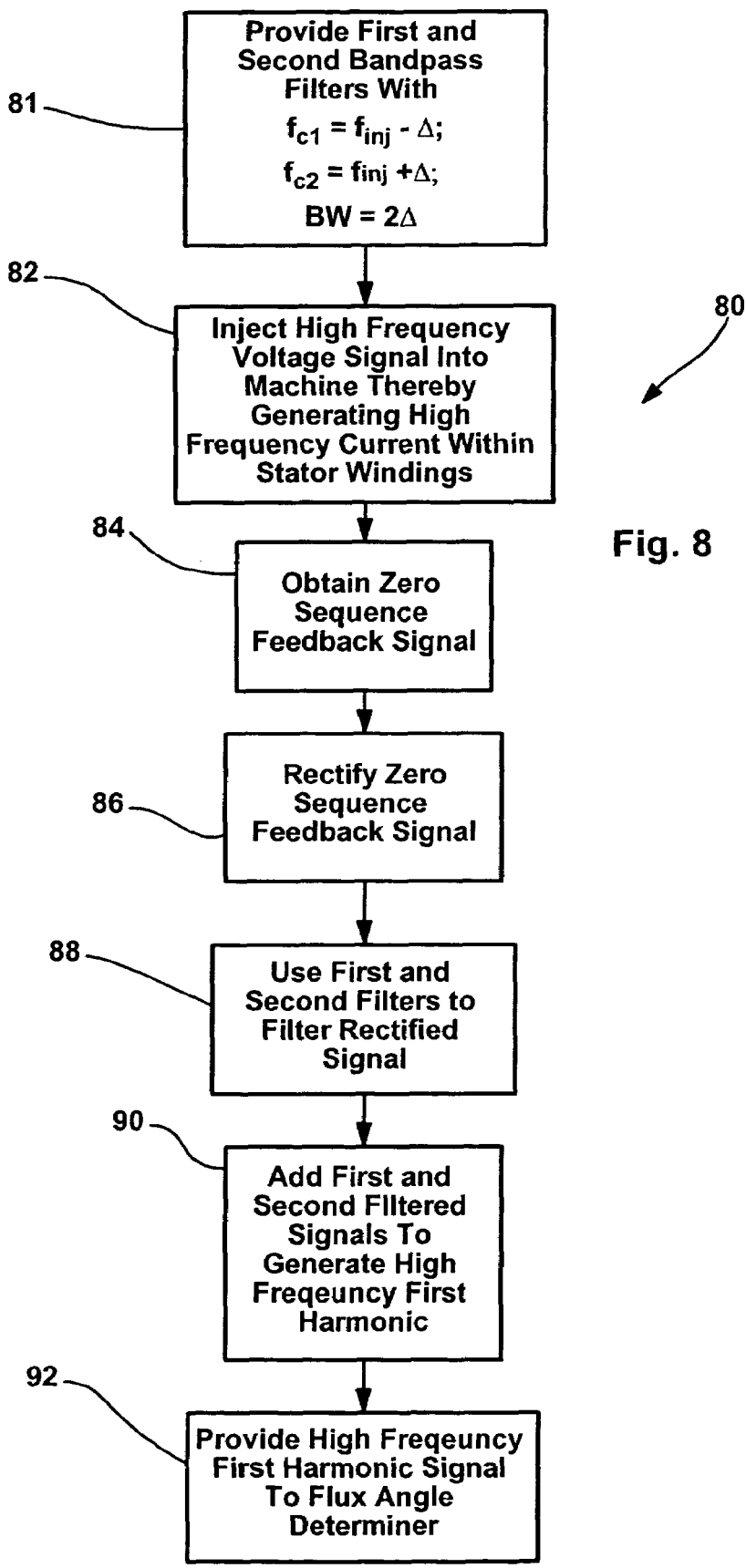
FIG. 8 is flow chart illustrating an inventive method according to the present invention.

Referring now to FIG. 8, an exemplary method 80 according to the present invention is illustrated. Referring also to FIGS. 5, 6, and 7, assuming a system like the one illustrated in FIG. 5, and, assuming a high frequency input signal $\omega_h$ which commands a 200 Hz high frequency injected signal (i.e., $f_{inj}$ is equal to 200 Hz), at block 81, a rectifier is provided as well as first and second band pass filters as illustrated in FIG. 6. Consistent with the example above, the first filter has a bandwidth equal $2\Delta$ and a center frequency $f_{c1}$ equal to $(f_{inj}-\Delta)$ Hz while the second filter has a bandwidth equal to $2\Delta$ and a center frequency $f_{c2}$ equal to $(f_{inj}+\Delta)$ Hz. At block 82, with the controller 10 and motor 28 operating in a normal fashion, a high frequency 200 Hz voltage signal is injected into motor 28 thereby generating a high frequency current within the stator windings. At block 84, a complicated zero sequence feedback signal $V_{zs}$ results at common node 21.

At block 86, rectifier 100 rectifies signal $V_{zs}$ providing a rectified signal to each of filters 102 and 104. At block 88, the first and second filters 102 and 104, respectively, are used to filter the rectified signal providing first and second filtered signals, respectively, to summer 106. At block 90, summer 106 adds the first and second filtered signals thereby generating a high frequency zero sequence signal $V_{hfzs}$ that is dominated by the high frequency first harmonic component. At block 92, the high frequency zero sequence signal $V_{hfzs}$ is provided to flux angle determiner 46 in FIG. 5.

Figure 4:
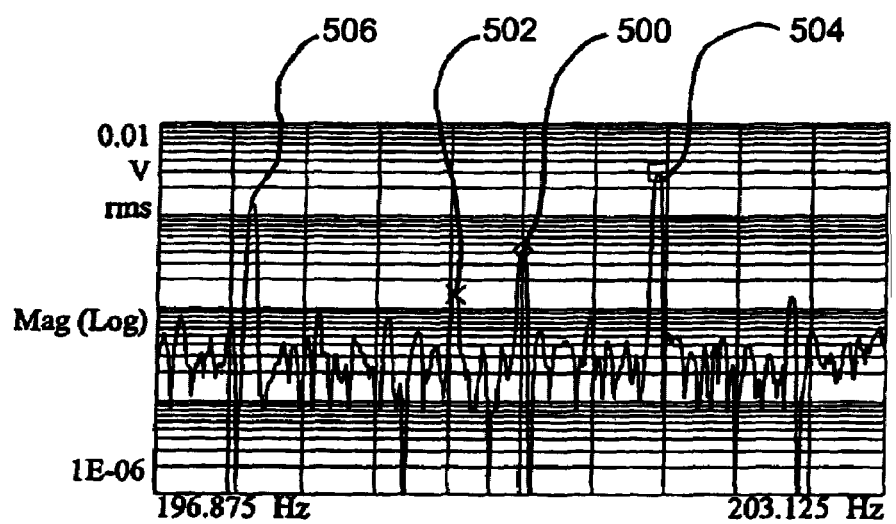
FIG. 4 is a graph illustrating a portion of a frequency spectrum of a zero sequence voltage feedback signal.
Figure 11:
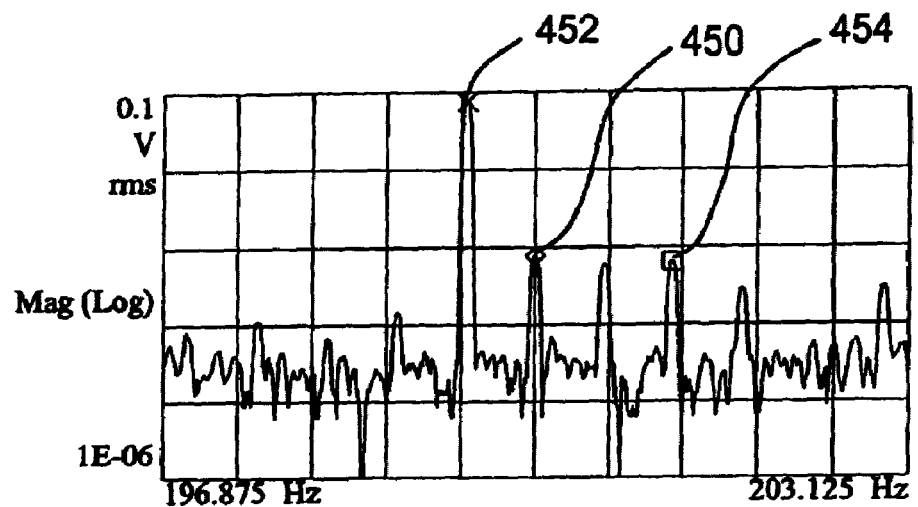
FIG. 11 is a graph similar to FIG. 4, albeit illustrating a frequency spectrum corresponding to a rectified signal like the signal of FIG. 10.

Referring now to FIG. 11, FIG. 11 is similar to FIG. 4 described above, albeit illustrating the zero sequence spectrum of a rectified signal like the signal illustrated in FIG. 10 within a PBI. In FIG. 11, spike 450 corresponds to the injected frequency component (e.g., 200 Hz) spike 452 corresponds to the high frequency first harmonic component (e.g., consistent with the example described above with respect to FIG. 4, this component is 199.4219 Hz), and, spike 454 corresponds to the high frequency second harmonic component. The high frequency fourth harmonic component is not appreciable and hence is not separately labeled in FIG. 11. Comparing FIGS. 4 and 11, it should be appreciated that, after rectification, first harmonic component 452 is clearly dominant within the PBI. More specifically, whereas the first harmonic component in FIG. 4 has an amplitude less than 5% of the second harmonic component, the first harmonic component 452 in FIG. 11 is approximately 115 times as large as the second harmonic component 454.

Figure 12:
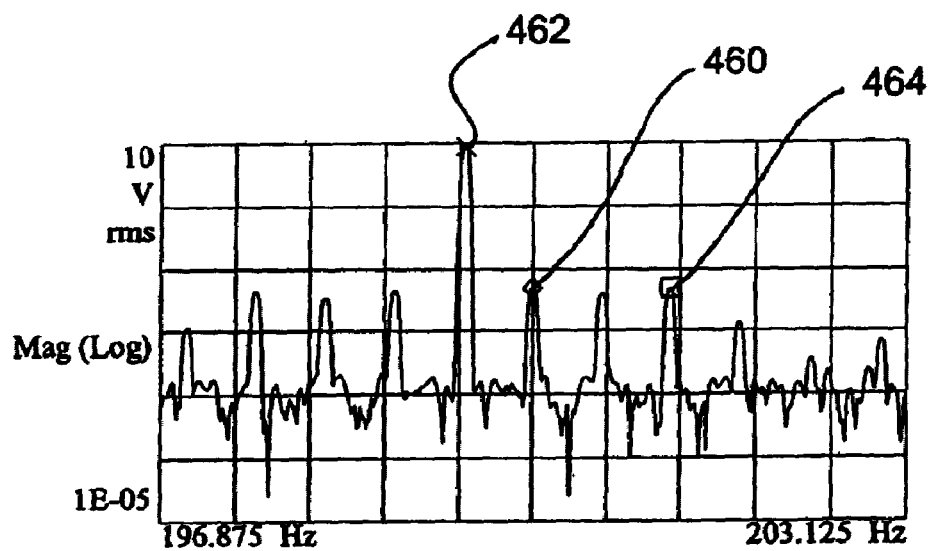
FIG. 12 is similar to FIG. 11, albeit illustrating a frequency spectrum corresponding to a rectified and filtered signal according to the present invention.

Referring now to FIG. 12, an exemplary frequency spectrum within the PBI corresponding to the output of summer 106 after filtering via filters 102 and 104 is illustrated. In FIG. 12, spike 460 corresponds to the injected frequency component, spike 462 corresponds to the high frequency first harmonic component and spike 464 corresponds to the high frequency second harmonic component. Here, as illustrated, filters 102 and 104 further increase the difference in magnitude between the first and second harmonic components of the high frequency feedback signal. As illustrated, the ratio of the first to second harmonic component amplitudes is approximately 170. Referring again to FIG. 7, it should be appreciated that in addition to yielding a signal dominated by the first harmonic, the signal provided by summer 106 is also characterized by minimal phase shift within the PBI 544.

Figure 13:
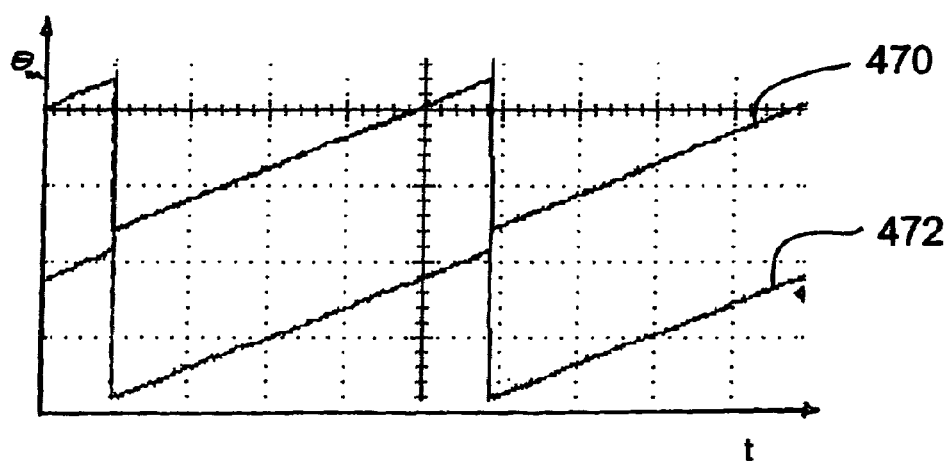
FIG. 13 is a graph illustrating a flux angle waveform generated using an encoder and a flux angle estimated waveform generated using a controller according to at least one embodiment of the present invention.
Figure 14:
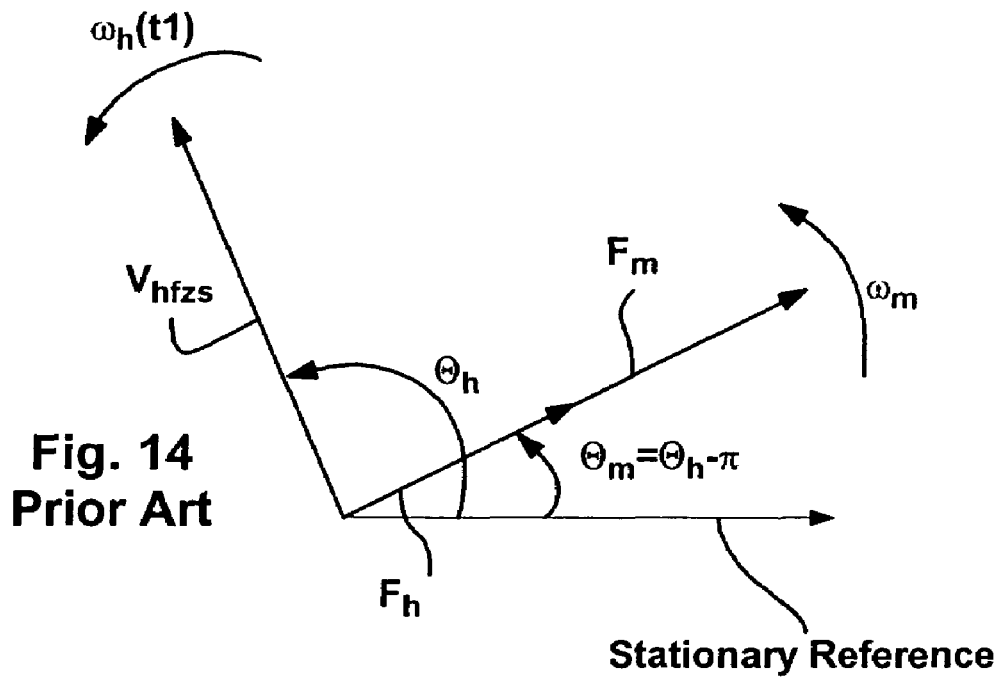
FIG. 14 is a phasor diagram illustrating the relationship between various system operating parameters in a system including a high frequency injection voltage.
Figure 15:
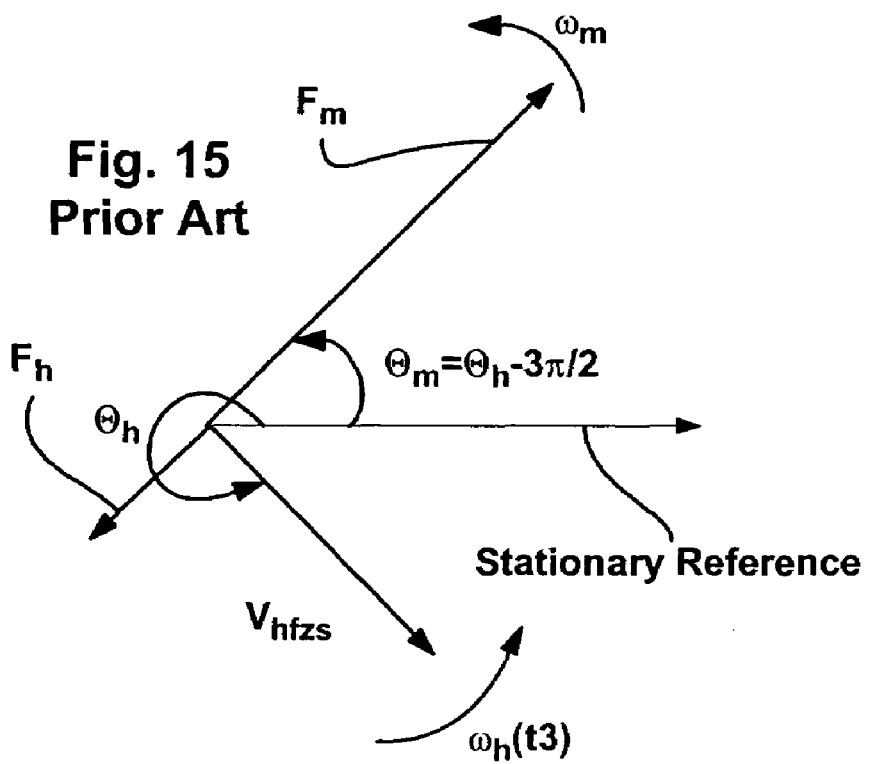
FIG. 15 is similar to FIG. 14 albeit at a different instant in time.

Referring now to FIG. 13, experimental results are illustrated wherein a first waveform 470 corresponds to a flux angle determined using an encoder and waveform 472 corresponds to an estimated flux angle using the rectifier/filter configuration described above and a Consoli type method. As illustrated, the estimated angle 472 precisely tracks the encoder generated angle 470 as desired.

It should be understood that the methods and apparatuses described above are only exemplary and do not limit the scope of the invention, and that various modifications could be made by those skilled in the art that would fall under the scope of the invention. For example, while the invention is described above in the context of a motor control system where the second harmonic component of the high frequency zero sequence feedback voltage signal was dominant, it has been recognized that even where other harmonics are dominant, rectification will nevertheless yield a rectified signal where the high frequency first harmonic is dominant. Thus, for instance, it is contemplated, that the $4^{th}$, $8^{th}$, etc., harmonic component may be dominant in some systems. In these case, as in the case of systems where the second harmonic component is dominant, rectification yields a feedback signal having a dominant high frequency first harmonic component. In addition, in some embodiments, the bandwidth BW of each of the first and second filters may be less than or greater than two times the $\Delta$ value. Here, the important limitation is that, when the phase characteristic waveforms of the first and second filters are added, a minimal or, at least acceptable phase shift within the PBI should result. Moreover, it is conceivable that two bandpass filters having different bandwidths may be used to configure a filter assembly according to some embodiments of the invention. Furthermore, other filter configurations may be used with the rectifier wherein the filter configurations meet phase shift criteria. In this regard, the filter configuration should have less than 10 degrees of phase shift within 2% of the injected voltage component frequency. I some applications the filter arrangement should have less than 4 degrees of phase shift within 1.5% of the injected frequency. Even less phase shift is contemplated in other embodiments. In addition, while the rectifier is particularly useful and the two filter configuration is also useful, each of the rectifier and two filter configuration independently have advantages and may be used separately with a Consoli type method or a similar method to improve flux angle determination.

To apprise the public of the scope of this invention, the following claims are made:

What is claimed is:

1. A method for use with a controller that supplies voltages to an induction machine via supply lines, the voltages including a fundamental voltage component and an injected voltage component, the line voltages also including harmonic voltage components where the harmonic voltage components include at least a high frequency first harmonic component having a frequency substantially equal to the sum of the fundamental component frequency and the injected component frequencies, the method for identifying the high frequency first harmonic component and comprising the steps of:

sensing the line voltages;
identifying a zero sequence voltage component of the line voltages;
rectifying the zero sequence voltage component to generate a rectified signal; and
using the rectified signal to identify the high frequency first harmonic component.

2. The method of claim 1 wherein the step of using the rectified signal includes the step of band pass filtering the rectified signal.

3. The method of claim 2 wherein the step of band pass filtering includes the step of providing first and second band pass filters having first and second center frequencies that are greater than and less than the injected voltage component frequency, respectively, and filtering the rectified signal using the first and second filters to generate first and second filtered signals, respectively, and, wherein, the step of using further includes the step of mathematically combining the first and second filtered signals to generate the first harmonic component.

4. The method of claim 3 wherein the step of mathematically combining includes adding the first and second filtered signals.

5. The method of claim 3 wherein the step of providing first and second filters includes providing first and second filters having first and second bandwidths where each of the first and second bandwidths includes the injected voltage component frequency.

6. The method of claim 5 wherein the step of providing filters includes providing first and second filters that have center frequencies that are one half the filter bandwidths greater than and less than the injected voltage component frequency, respectively.

7. The method of claim 1 wherein the step of using the rectified signal includes the step of providing a filter arrangement having less than 10 degrees phase shift within 2 percent of the injected voltage component frequency and filtering the rectified signal to via the provided filter to generate the first harmonic component.

8. The method of claim 7 wherein the step of providing a filter arrangement includes providing an arrangement having less than 4 degrees phase shift within 1.5 percent of the injected voltage component frequency.

9. A method for use with a controller that supplies voltages to an induction machine via supply lines, the voltages including a fundamental voltage component and an injected voltage component, the line voltages also including harmonic voltage components where the harmonic voltage components include at least a high frequency first harmonic component having a frequency substantially equal to the sum of the fundamental component frequency and the injected component frequencies, the method for identifying the high frequency first harmonic component and comprising the steps of:
identifying a derivative of the supply line voltages;
filtering the derivative using a first band pass filter having a center frequency that is less than the injected voltage frequency and a bandwidth that includes the injected voltage frequency thereby generating a first filtered signal;
filtering the derivative using a second band pass filter having a center frequency that is greater than the injected voltage frequency and a bandwidth that includes the injected voltage frequency thereby generating a second filtered signal;
mathematically combining the first and second filtered signals to generate a combined signal; and
using the combined signal to identify the first harmonic component.

10. The method of claim 9 wherein the step of identifying a derivative includes the step of identifying a zero sequence voltage component of the line voltages and using the zero sequence voltage component as the derivative.

11. The method of claim 9 wherein the step of identifying a derivative includes the step of identifying a zero sequence voltage component of the line voltages and rectifying the zero sequence voltage component to generate the derivative.

12. The method of claim 9 wherein the bandwidths of the first and second filters have identical widths and include maximum and minimum cutoff frequencies, respectively, that each equal the injected voltage frequency.

13. The method of claim 9 wherein the step of mathematically combining includes adding the first and second filtered signals.

14. A method for use with a controller that supplies voltages to an induction machine via supply lines, the voltages including a fundamental voltage component and an injected voltage component, the line voltages also including harmonic voltage components where the harmonic voltage components include at least a high frequency first harmonic component having a frequency substantially equal to the sum of the fundamental component frequency and the injected component frequencies, the method for identifying the high frequency first harmonic component and comprising the steps of:
identifying a zero sequence voltage component from the supply lines;
rectifying the zero sequence voltage component to generate a rectified signal;
filtering the rectified signal using a first band pass filter having a center frequency that is less than the injected voltage frequency and a bandwidth that includes the injected voltage frequency thereby generating a first filtered signal;
filtering the rectified signal using a second band pass filter having a center frequency that is greater than the injected voltage frequency and a bandwidth that includes the injected voltage frequency thereby generating a second filtered signal; and
adding the first and second filtered signals to generate the first harmonic component.

15. An apparatus for use with a controller that supplies voltages to an induction machine via supply lines, the voltages including a fundamental voltage component and an injected voltage component, the line voltages also including harmonic voltage components where the harmonic voltage components include at least a high frequency first harmonic component having a frequency substantially equal to the sum of the fundamental component frequency and the injected component frequencies, the apparatus for identifying the high frequency first harmonic component and comprising:
a determiner for identifying a zero sequence voltage component of the supply line voltages;
a rectifier for rectifying the zero sequence voltage component to generate a rectified signal; and
a filter using the rectified signal to identify the high frequency first harmonic component.

16. The apparatus of claim 15 wherein the filter includes at least one band pass filter.

17. The apparatus of claim 16 wherein the filter includes at least first and second band pass filters.

18. The apparatus of claim 17 wherein the first and second band pass filters have first and second center frequencies that are greater than and less than the injected voltage component frequency, respectively, and generate first and second filtered signals, respectively, the filter further including a summer for summing the first and second filtered signals to generate the first harmonic component.

19. The apparatus of claim 17 wherein the first and second filters have center frequencies that are a ($\Delta$) value greater than and less than the injected voltage component frequency and that have band widths that are twice the ($\Delta$) value.

20. The apparatus of claim 15 wherein the filter has less than 10 degrees phase shift within 2 percent of the injected voltage component frequency.

21. The apparatus of claim 20 wherein the filter has less than 4 degrees phase shift within 1.5 percent of the injected voltage component frequency.

22. An apparatus for use with a controller that supplies voltages to an induction machine via supply lines, the voltages including a fundamental voltage component and an injected voltage component, the line voltages also including harmonic voltage components where the harmonic voltage components include at least a high frequency first harmonic component having a frequency substantially equal to the sum of the fundamental component frequency and the injected component frequencies, the apparatus for identifying the high frequency first harmonic component and comprising:

a component for identifying a derivative of the supply line voltages;

a first filter for filtering the derivative using a first band pass filter having a center frequency that is less than the injected voltage frequency and a bandwidth that includes the injected voltage frequency thereby generating a first filtered signal;

a second filter for filtering the derivative using a second band pass filter having a center frequency that is greater than the injected voltage frequency and a bandwidth that includes the injected voltage frequency thereby generating a second filtered signal; and a combiner for combining the first and second filtered signals to generate an output signal indicative of the first harmonic component.

23. The apparatus of claim 22 wherein the component for identifying a derivative includes a resistive configuration linked to the supply lines for identifying a zero sequence voltage component and wherein the derivative is the zero sequence voltage component.

24. The apparatus of claim 22 wherein the component for identifying a derivative includes a resistive configuration linked to the supply lines for identifying a high frequency zero sequence voltage component and a rectifier for rectifying the zero sequence voltage component to generate a rectified signal and wherein the derivative is the rectified signal.

25. The apparatus of claim 22 wherein the bandwidths of the first and second filters have identical widths and include maximum and minimum cutoff frequencies that each equal the injected voltage frequency.

26. The apparatus of claim 22 wherein the combiner is a summer.

* * * * *